United States Patent [19]

Kuraishi

[11] 4,252,426
[45] Feb. 24, 1981

[54] FLASHING SYSTEM FOR ELECTRONIC FLASHING APPARATUS

[75] Inventor: Kaoru Kuraishi, Tokyo, Japan

[73] Assignee: Toshiba Photo Products Co., Ltd., Tokyo, Japan

[21] Appl. No.: 101,901

[22] Filed: Dec. 10, 1979

[30] Foreign Application Priority Data

Dec. 27, 1978 [JP] Japan ............................ 53-180318[U]
Mar. 23, 1979 [JP] Japan .............................. 54-37735[U]

[51] Int. Cl.³ ........................ G03B 15/05; G03B 17/08
[52] U.S. Cl. ...................................... 354/64; 354/131; 354/145
[58] Field of Search ................... 354/34, 64, 131, 145, 354/266; 315/241 P

[56] References Cited

U.S. PATENT DOCUMENTS 3,786,734  1/1974  Long, Jr. et al. ................. 354/145 X
4,012,749  3/1977  Numata ................................ 354/145

Primary Examiner—Michael L. Gellner
Attorney, Agent, or Firm—Darby & Darby

[57] ABSTRACT

A flashing system for an electronic flashing apparatus comprises a camera including a switch adapted to be closed in response to shutter releasing and an electronic flashing apparatus including a light-sensitive element, a trigger circuit actuated when the light-sensitive element is rendered conductive and a flashing element adapted to emit flash light when the trigger circuit is actuated. The system further comprises a connector including an optical fiber bundle and connected between the camera and electronic flashing apparatus. The connector also includes a plug portion detachably connected to the camera and including a light emitting diode which emits a light in response to the shutter releasing. The optical fiber bundle transmits the light to the electronic flashing apparatus for irradiating the light-sensitive element and making it conductive. Thus, the flashing element is rendered to flash. In this way, the electronic flashing apparatus is operated without using any electric connector.

13 Claims, 11 Drawing Figures

F I G. 1
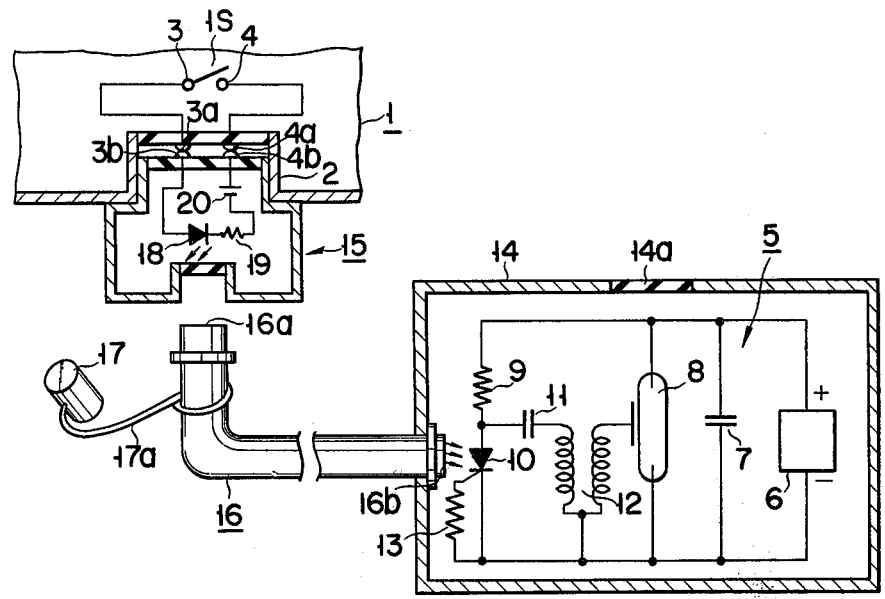
F I G. 2A
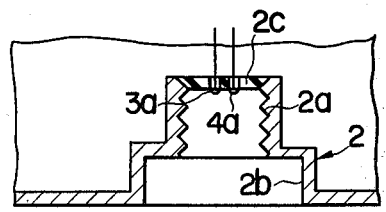
F I G. 2B
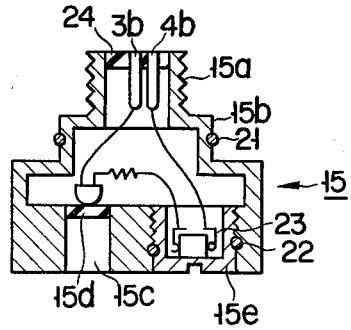

F I G. 5A
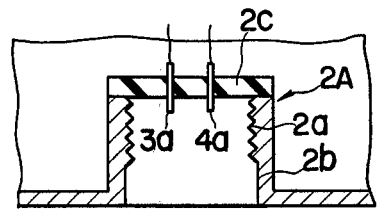
F I G. 5B
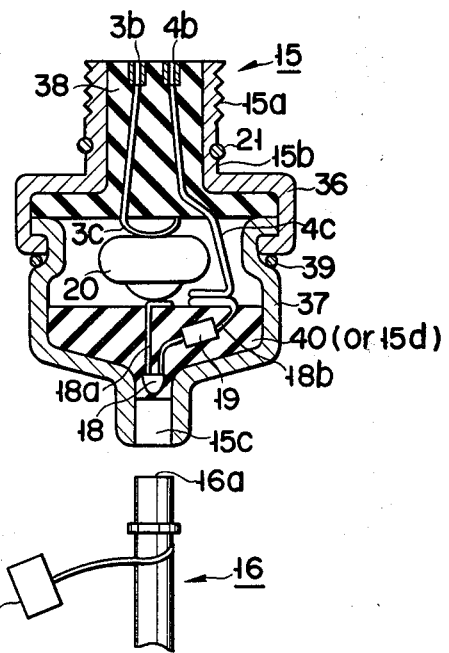
F I G. 5C
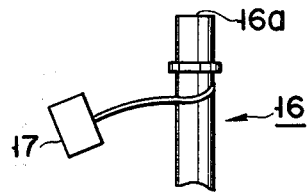

FLASHING APPARATUS

This invention relates to a flashing system for an electronic flashing apparatus, which is used for causing flashing of the electronic flashing apparatus under water and, more particularly, to a flashing system for an electronic flashing apparatus, with which it is unnecessary to electrically couple a camera and an electronic flashing apparatus.

When taking a photograph under water, a camera having a water-proof structure and also, if necessary, an electronic flashing apparatus for momentarily illuminating the foreground object to be photographed are used. The flashing of the electronic flashing apparatus must be caused in synchronism with the operation of releasing the shutter of the camera. Hitherto, it has been in practice to use an electric cord as a connector for connecting the camera and flashing apparatus, with one end of the cord connected to the electronic flashing apparatus and the other end of the cord provided with a pair of electric connection terminals, which are removably connected to a switch adapted to be closed in an interlocked relation to the operation of the camera shutter. The juncture between the afore-mentioned connection terminals of the cord and the switch is of course made water-proof to permit photographing under water. However, in the special state of use for photographing under water the cord is liable to be detached, and in such a case the connection terminals of the cord are electrically connected to each other by water to result in casual flashing of the electronic flashing apparatus. Particularly, when taking pictures under sea water with the accidental detachment of the cord the connection terminals are kept connected for a long time, so that not only casual flashing but also a trouble in the electronic flashing apparatus is likely to be caused. In addition, when using the aforementioned electric cord as connector the replacement of the electronic flashing apparatus under water is impossible, which is inconvenient for taking photographs under water.

Accordingly, an object of the invention is to provide a flashing system for an electronic flashing apparatus, with which a light signal is transmitted from the camera to the electronic flashing apparatus in synchronism with the operation of releasing the camera shutter for causing flashing of the electronic flashing apparatus in synchronism with the camera shutter operation.

The system according to the invention comprises a camera including a switch adapted to be closed in response to releasing of the camera shutter; an electronic flashing apparatus including a light-sensitive element, a trigger circuit actuated when the light-sensitive element is rendered conductive and a flashing element adapted to emit flash light when the trigger circuit is actuated; and a connector including a light-emitting section including a series circuit of a power supply and a light-emitting element and provided on the camera such that the light-emitting element is caused to emit light when the switch is closed and an optical fiber bundle means coupled between the light-emitting section and the electronic flashing apparatus and serving to guide a light from the light-emitting section to the electronic flashing apparatus so as to irradiate the light-sensitive element for rendering it conductive.

According to the invention, even if one end of the afore-mentioned optical fiber bundle means is detached from the light-emitting section under water, the electronic flashing apparatus is never caused to flash unless light is incident upon the detached end of the fiber bundle means. This means that it is possible to couple a second flashing apparatus in lieu of the first one to the camera under water.

FIG. 1 is a schematic representation, partly in section, showing one embodiment of the invention;

FIG. 2A is a sectional view showing a socket section of the camera shown in FIG. 1;

FIG. 2B is a sectional view showing an example of the light-emitting section used in the system according to the invention;

FIG. 5A is a sectional view showing another example of the socket section of the camera;

FIG. 5B is a sectional view showing another example of the light-emitting section coupled to the socket section shown in FIG. 5A;

FIG. 5C is a view showing one end of an optical fiber bundle means removably coupled to the light-emitting section shown in FIG. 5B;

Figure 3:
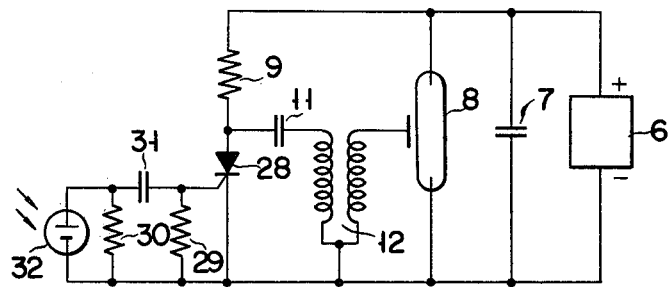
FIG. 3 is a circuit diagram showing another example of the electronic flashing apparatus used in accordance with the invention.

Referring now to FIG. 1, a camera frame generally designated at 1 is provided with a socket section 2, which has a structure of sealing the camera frame 1 water-tight from the outside. Inside the camera frame 1 a synchronous contact switch 1S having contacts 3 and 4 adapted to be closed in an interlocked relation to releasing the camera shutter is provided, and the contacts 3 and 4 are connected to respective contact terminals 3a and 4a exposed on the outer side of the bottom portion of the socket section 2. An electronic flashing apparatus, which is coupled to the camera when using it, includes a power supply 6, a main discharge capacitor 7 connected in parallel with the power supply, a flashing discharge tube 8 also connected in parallel with the power supply and adapted to flash at the time of the discharge of the main discharge capacitor, and a trigger circuit for causing the flashing of the flashing discharge tube 8. The trigger circuit includes a light activated controlled rectifier element 10 connected in series with a resistor 9 across the flashing discharge tube 8 and rendered conductive when irradiated with light, a trigger transformer 12 connected between the electrode of the light activated controlled rectifier element 1 10 via another capacitor 11 and a resistor 13 connected between the gate and cathode of the controlled rectifier element 10. The juncture between the primary and secondary windings of the trigger transformer 12 is connected to the negative terminal of the power supply 6. The electronic flashing apparatus 5 includes a water-tight casing 14, which is provided with a transparent window 14a for projecting light from the discharge tube 8 to the outside. The connector used for the system according to the invention includes an optical fiber bundle means 16 having one end 16a removably coupled to the light-emitting section 15 and the other end 16b coupled to the casing 14. Of course, the optical fiber bundle means is protected by an outer cover, but the means 16 is shown as a continuous optical fiber bundle. A cap 17 is tied by a chain 17a to the end 16a of the optical fiber bundle 16. When the end 16a is not coupled to the light-emitting section 15, the cap 17 is fitted on the end 16a to prevent light from entering there. The light activated controlled rectifier element 10 is disposed at a suitable position for efficiently receiving light emitted from the other end 16a of the optical fiber bundle. The light-emitting section 15 has exposed contacts 3b and 4b, light-emitting element 18, a current limiting resistor 19 and a battery 20 in series with one another. When the light-emitting section 15 is completely coupled to the socket section 2, the contacts 3a and 3b are electrically connected to the respective contacts 4a and 4b.

With the above construction, with releasing of the camera shutter the switch 1S is momentarily closed to cause the light-emitting element 18 to emit light. This light is incident on the end 16a of the optical fiber bundle and is transfered to the other end 16b to energize the light-sensitive element 10. As a result, the element 10 is rendered conductive to cause discharging of the capacitor 11, whereupon a trigger pulse is supplied through the trigger transformer 12 to the trigger terminal of the discharge tube 8 to cause it flash. The flash light is projected through the window 14a to illuminate the foreground object.

An example of the socket section 2 of the camera and the light-emitting section 15 of the connector will now be described in detail with reference to FIGS. 2A and 2B. The socket section 2 includes a female thread portion 2a and a water-tight wall portion 26. The bottom open end of the female thread portion 2a is sealed with an insulating member 2c, and the contact terminals 3a and 4a are provided on the insulating member 2c and exposed to the space defined within the female thread portion. The casing in the example of the light-emitting section 15 shown in FIG. 2B includes a male thread portion 15a (first portion) to be coupled to the aforementioned female thread portion 2a for coupling the light-emitting section to the socket section 2, a portion 15b (second portion) carrying an O-ring 21 for fitting this O-ring 21 water-tight in the water-tight wall 2b, a recess portion 15C (third portion) in which the end 16a of the optical fiber bundle 16 is removably inserted and held and a transparent member (forth portion), for instance a transparent plate 15d, for coupling light of the light-emitting element 18 to the end 16a. It further includes a battery holder member 15e for removably supporting the battery 20. The battery holding member 15e is mounted removably and water-tight by a male screw and a second O-ring 22 in part of the casing of the light-emitting section. The battery 20 is held by a spring member 23 in te inner space of the battery holding member 15e. The male thread portion 15a has its open end sealed water-tight by an insulating member 24, and the terminals 3b and 4b penetrate the insulating member 24 and are exposed. Thus, when the male thread portion 15a is completely coupled to the female thread portion 2a, the contacts 3a and 3b are electrically connected to the contacts 4a and 4b. The light-emitting element 18 is disposed within the casing of the light-emitting section 15 and positioned on the transparent plate 15d, and the terminal 3b, light-emitting element 18, current limiting resistor 19, battery 20 and terminal 4b are disposed in the inner space of the casing such that they form a series circuit as mentioned earlier in connection with FIG. 1. In this embodiment, the socket section 2 and light-emitting section 15 are coupled together while they are not submerged in water, and the junctures between the contacts between 3a and 3b and between 4a and 4b are protected in the water-proof state even under water, so that short-circuit of the contacts 3b and 4b and casual flashing of the light-emitting element 18 will never happen. Thus, even when the end 16a of the optical fiber bundle is accidentally detached from the recess 15c of the light-emitting section 15 while the camera is being handled, the flashing of the electronic flashing apparatus 5 is never caused unless light is incident on the end 16a. This means that the electronic flashing apparatus may be replaced with another one under water. With the prior-art electronic flashing apparatus of this type, specific two points in a trigger circuit in the apparatus are connected to each other through two second contacts in contact with the respective first contacts 3a and 4a for causing flashing of a flashing discharge tube. Therefore, if the second contacts are detached from the first contacts under water, they are connected to each other by water to cause flashing of the discharge tube, so that it is impossible to replace the electronic flashing apparatus under water.

According to the invention, if it is desired to cause flashing of a second electronic flashing apparatus in synchronism with the flashing of the first one, the end 16a of the optical fiber bundle coupled to the second electronic flashing apparatus may be positioned to face the window 14a of the first electronic flashing apparatus by removing the cap 17 from the end 16a.

Figure 4:
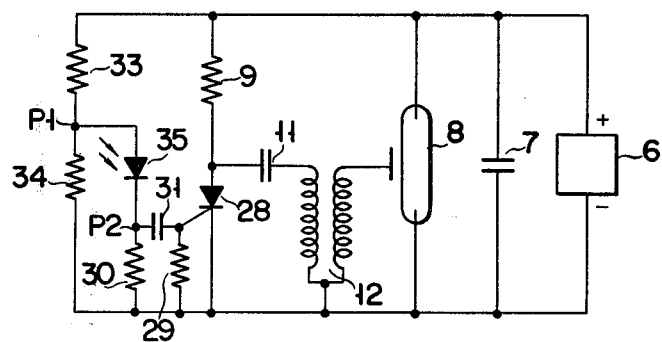
FIG. 4 is a circuit diagram showing a further example of the electronic flashing apparatus used in accordance with the invention.

FIGS. 3 and 4 show modifications of the electronic flashing apparatus used in accordance with the invention. In these Figures, like parts as those in FIG. 1 are designated by like reference numerals. In the example of FIG. 3, an SCR 28 is connected in series with resistor 9 across main discharge capacitor 7, with its anode connected to one end of capacitor 11. A resistor 29 is connected between the gate and cathode of the SCR 28, and a capacitor 31 is also connected in series with a resistor 30 between the gate and cathode. A solar battery 32 which produces electromotive force when it receives light is connected across the resistor 30 in the illustrated polarity. When light is coupled from the other end 16b of the optical fiber bundle 16 to the element 32, an electromotive force is produced therein and applied between the gate and cathode of the SCR 28 to momentarily render the SCR 28 conductive. Thus, the flashing apparatus 8 is caused to flash in synchronism with the operation of releasing the camera shutter.

In the example of FIG. 4, the trigger circuit includes resistor 9, SCR 28, resistor 29, capacitor 31 and resistor 30 like the circuit of FIG. 3, and these portions of the trigger circuit is not described here in any further. In this example, a voltage divider consisting of series resistors 33 and 34 is connected across capacitor 7, and between its voltage division point P1 and the juncture P2 between the capacitor 31 and resistor 30 a light responsive diode 35 is connected in the illustrated polarity. In this circuit, when the photosensitive diode 35 receives light from the other end 16b of the optical fiber bundle, it is rendered conductive to give a gate voltage to the SCR 28 so as to render the SCR 28 conductive. In this way, the discharge tube 8 is caused to flash in response to the shutter releasing operation.

FIG. 5A shows another example of the socket section of the camera, and FIG. 5B shows another example of the light-emitting section which is suited to this socket section. The socket section 2A of FIG. 5A is different from the socket section shown in FIG. 1 in that the terminals 3a and 3b penetrate insulating member 2c and project into the inner space defined by a female thread portion 2a. The light-emitting section 15 includes a first casing 36, a second casing 37 and a plug body 38. The second casing 37 has a bayonet structure coupled watertight by an O-ring 39 to the opening of the first casing 36, and the plug body 38, which is provided within the first casing 36 consists of an insulating resin body rotatably holding the first casing 36. The plug body 38 has terminals 3b and 4b embedded in and secured to it for receiving the projecting terminals 3a and 3b. Leads 3c and 4c leading from the respective terminals 3b and 4b are secured in the insulating resin body 38, and their end portions led out from the resin body also serve as respective springs. The first casing 36 includes a male thread portion 15a (first portion) coupled to the female thread portion 2a of the socket portion 2A of the camera and a portion (second portion) 15b for contacting an O-ring 21 to the wall 2b is provided on the first casing, thus maintaining the junctures between the terminals 3a, 3b, and between 4a, 4b free from water. Part of the inner space of the second casing 37 is filled with a transparent insulating resin 40, and the light-emitting element 18 (a light emitting diode in this example) and a current limiting resistor 19 are burried in the resin body 40. A lead terminal 18a of the light-emitting diode is supported in and led from the resin body 40, and its end portion led out from the resin body is made to serve also as a spring. The other lead terminal 18b is provided with the resistor 19 and is also supported in the resin body 40, and its end portion led out from the resin body is also made to serve also as a spring. The battery 20 is supported between the corresponding ends of the leads 3c and 18a, and the corresponding ends of the leads 4c and 18b are held in electric contact with each other. The second casing 37 includes a recess portion 15c (third portion), in which the end 16a of the optical fiber bundle 16 is inserted and held, as well as the transparent body 40 (fourth portion), the essential role of which is to transmit light from the light-emitting element 18 to the end 16a. While in this example the transparent resin body 40 is wholly made of a transparent resin, the same effects may also be obtained by using a transparent body for only a portion surrounding the light-emitting element 18.

In this example, the socket section and light-emitting section are again coupled together while they are not submerged in water. More particularly, the male thread portion 15a is screwed into the female thread portion 2a by removing the second casing 37 from the first casing 36. Then, the projecting terminals 3a and 3b are inserted into the recesses of the terminals 3b and 4b by pushing the plug body 38. Thereafter, the battery 20 is loaded with its one end in contact with the end portion of the lead 3c led out from the plug body, and in this state the open end of the second casing 37 is fitted in the open end of the first casing 36 to complete the coupling. In this way, terminal 3b, battery 20 light-emitting element 18, resistor 19 and terminal 4b are connected in series. With this example, there is no need of using the battery holding member 15e or transparent plate 15d. Also, since the whole casing can be co-axially constructed, the manufacture of the plug section can be simplified.

Figure 7:
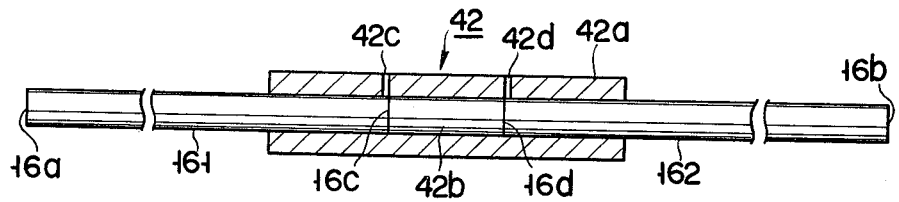
FIG. 7 is a sectional view showing an example of a light coupler in the optical fiber bundle means shown in FIG. 6.
Figure 8:
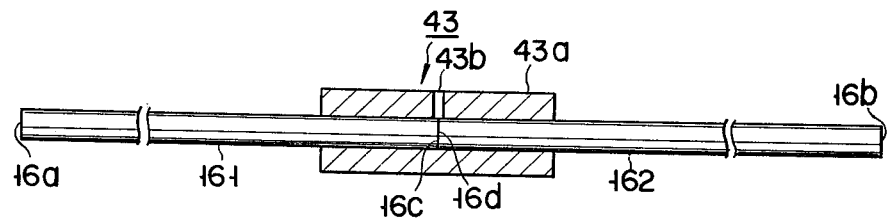
FIG. 8 is a schematic representation, partly in section, showing another example of the light coupler in the optical bundle means shown in FIG. 6.

FIGS. 7 and 8 show modifications of the optical fiber bundle means of the connector used in accordance with the invention. In the Example of FIG. 7, the optical fiber bundle generally designated at 16 comprises a first section 161 having first and second ends 16a and 16c and a second section 162 having first and second ends 16b and 16d. The ends 16c and 16d of these sections are optically coupled together by a coupler 42. The coupler 42 comprises a tubular member 42a having a see-through bore and an optically transparent member such as a glass member 42b inserted in a substantially central portion of the see-through bore. The member 42a is provided at its positions corresponding to the opposite ends of the member 42b with respective drain holes 42c and 42d communicating its inner and outer sides. The second end 16c of the first section 161 of the optical fiber bundle means and the second end 16d of the second section 162 are removably inserted into the see-through bore from the opposite ends thereof, whereby the sections 161 and 162 are optically coupled to each other. The first end 16a of the first bundle section 161 is inserted into the recess 15c in the light-emitting section shown in FIG. 2B or 5B. The first end 16b of the second bundle section 162 is coupled to the casing 14 of the electronic flashing apparatus as described earlier in connection with FIG. 1. In case of coupling the electronic flashing apparatus under water, the second end 16d of the second bundle section 162 may be optically coupled to the end 16c of the first section 161 with the coupler 42. In this case, it is desirable to provide a cap 17 tied to the neighborhood of the second end 16d of the second bundle section 162 so that it may be fitted on the end 16d when the end 16d is removed from the coupler 42.

Figure 6:
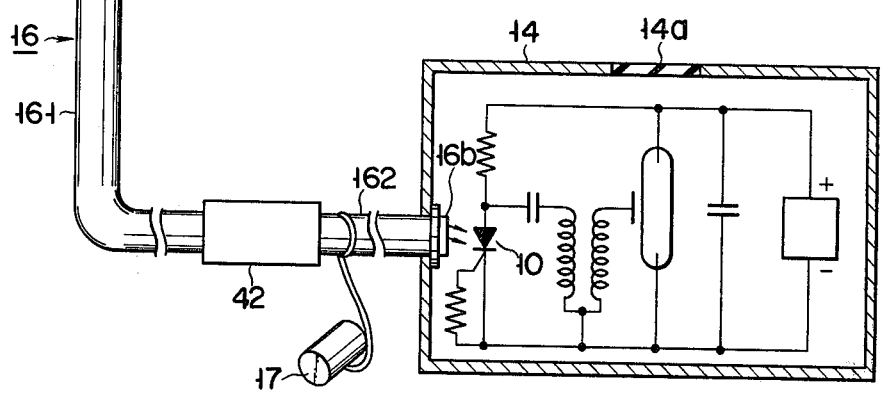
FIG. 6 is a schematic representation, partly in section, showing a further embodiment of the invention.

In the example shown in FIG. 8, the coupler generally designated at 43 consists of a sole tubular member 43a having a see-through bore. This member is provided substantially at its central portion with a drain hole 43b communicating its inner and outer sides. The ends 16c of the respective first and second bundle sections 161 and 162 are removably inserted into the see-through bore such that they are optically coupled to each other at the position of the drain hole 43b. FIG. 6 shows the connector including the optical fiber bundle means shown in FIG. 7 or 8 used for connecting the camera frame and electronic flashing apparatus.

What is claimed is:

1. A flashing system for an electronic flashing apparatus comprising:

a camera including a switch adapted to be closed in response to releasing of a camera shutter;

an electronic flashing apparatus including a light sensitive element, a trigger circuit activated when same light-sensitive element is rendered conductive, and a flashing element adapted to emit flash-light when said trigger circuit is activated; and a connector including a light-emitting section having a series circuit of a power supply and a light-emitting element and provided on said camera such that said light-emitting element is caused to emit light when said switch is closed, and an optical fiber bundle means containing at least one optical fiber coupled between said light-emitting section and said electronic flashing apparatus and serving to guide a light from said light-emitting section to said electronic flashing apparatus so as to irradiate said light-sensitive element for rendering it conductive.

2. A flashing system for an electronic flashing apparatus according to claim 1, wherein said light-sensitive element is a light activated silicon controlled rectifier.

3. A flashing system for an electronic flashing apparatus according to claim 1, wherein said light-sensitive element is a solar battery.

4. A flashing system for an electronic flashing apparatus according to claim 1, wherein said light-emitting element is a light-emitting diode.

5. A flashing system for an electronic flashing apparatus according to claim 1, wherein said light-emitting section is constituted in the form of a plug section removably fitted in a socket section of said camera having first and second exposed terminals of said switch;

said plug section including a casing provided on the outer side thereof with third and fourth exposed terminals respectively connected to said first and second terminals and accommodating a series circuit including said light-emitting element, said power supply and a current limiting resistor and connected between said third and fourth exposed terminals;

said casing having a first portion for coupling said plug section to said socket section, a second portion in water-tight contact with a packing for maintaining the electric connections between said first and third exposed terminals on one hand and between said second and fourth exposed terminals on the other hand water-tight, a third portion, to which one end of said optical fiber bundle means is coupled, and a fourth portion for leading light from said light-emitting element to said one end of said optical fiber bundle means.

6. A flashing system for an electronic flashing apparatus according to claim 5, wherein said packing is an O-ring.

7. A flashing system for an electronic flashing apparatus according to claim 5, wherein said first portion of said casing has a male thread screwed in a female thread in said socket section of the camera, said second portion carries said packing, said third portion has a recess to which one end of said optical fiber bundle means is removably coupled, and said fourth portion is a transparent body provided at the bottom of said recess and serving to transmit light from said light-emitting element to said one end of said optical fiber bundle means.

8. A flashing system for an electronic flashing apparatus according to claim 5, wherein said casing further has a battery accommodating section for removably holding said power sypply.

9. A flashing system for an electronic flashing apparatus according to claim 1, wherein said light-emitting section is constituted in the form of a plug section removably mounted in said socket section of the camera having first and second exposed terminals of said switch;

said plug section including a casing means having on the outer side thereof third and fourth exposed terminals respectively connected to said first and second terminals and accommodating a series circuit consisting of said light-emitting element, said power supply and a current limitting resistor and connected between said third and fourth terminals;

said casing means including a first casing and a second casing in the form of a bayonet structure coupled water-tight to the open end of said first casing;

said first casing having a first portion removably coupled to said socket section and a second portion in water-tight contact with a packing for maintaining the electric connections between said first and third exposed terminals on one hand and between said second and fourth exposed terminals on the other hand water-tight;

said second casing having a third portion for holding one end of said optical fiber bundle means and a fourth portion for leading light of said light-emitting element to said third portion;

said first casing further accommodating a first insulating member rotatable with respect to said first casing and carrying said third and fourth exposed terminals, said second casing accommodating a transparent second insulating member, said light-emitting element and current limitting resistor being burried in and fixed in position within said transparent insulating member, said power supply being disposed between said first and second insulating members.

10. A flashing system for an electronic flashing apparatus according to claim 1, wherein said optical fiber bundle means includes a cap for covering one end of said optical fiber bundle means when said one end is removed from said light-emitting section.

11. A flashing system for an electronic flashing apparatus according to claim 1, wherein said optical fiber bundle means includes a first optical fiber portion having a first end coupled to said light-emitting section, a second optical fiber portion having a first end coupled to said electronic flashing apparatus, and an optical coupler coupling the second ends of said first and second optical fiber portions.

12. A flashing system for an electronic flashing apparatus according to claim 11, wherein said optical coupler comprises a tubular member having a longitudinal see-through hole and a transparent member secured in position substantially in a central portion of said see-through hole, said tubular member being provided at positions thereof corresponding to the opposite ends of said transparent member with respective drain holes communicating the inner and outer sides of said tubular member, said second ends of said first and second optical fiber portions being coupled to each other through said optical coupler.

13. A flashing system for an electronic flashing apparatus according to claim 10, wherein said optical coupler is a tubular member having a longitudinal see-through hole and provided substantially at the central position with a drain hole communicating the inner and outer sides of said tubular member, said second ends of said first and second optical fiber portions being coupled to each other at the position of said drain hole.

* * * * *